United States Patent [19]

Mills

[11] 4,303,129

[45] Dec. 1, 1981

[54] FURROW DAMMING IMPLEMENT

[75] Inventor: Franky Mills, Plainview, Tex.

[73] Assignee: The Hamby Company, Plainview, Tex.

[21] Appl. No.: 118,406

[22] Filed: Feb. 4, 1980

[51] Int. Cl.³ ............................................ A01B 13/16
[52] U.S. Cl. .................................... 172/530; 172/143
[58] Field of Search ................ 172/530, 529, 44, 143, 172/500, 62

[56] References Cited

U.S. PATENT DOCUMENTS

| | | |
|---|---|---|
| Re. 21,709 | 2/1941 | Ficken . |
| 1,124,930 | 1/1915 | McAdams . |
| 1,611,817 | 12/1926 | Cook et al. ...................... 172/529 X |
| 2,043,076 | 6/1936 | Smith . |
| 2,098,738 | 11/1937 | Campbell ............................ 172/530 |
| 2,112,767 | 3/1938 | Ficken . |
| 2,130,970 | 9/1938 | Smith . |
| 2,174,045 | 9/1939 | Seaman .............................. 172/529 |
| 2,193,065 | 3/1940 | Erickson . |
| 2,193,275 | 3/1940 | Elliott ............................ 172/530 X |
| 2,217,381 | 10/1940 | Poor . |
| 2,226,575 | 12/1940 | Orelind . |
| 2,226,585 | 12/1940 | Seaholm . |
| 2,227,151 | 12/1940 | Orelind . |
| 2,247,788 | 7/1941 | Silver . |
| 2,249,864 | 7/1941 | Silver . |
| 2,318,562 | 5/1943 | Silver . |
| 2,367,412 | 1/1945 | Loomis . |
| 2,455,566 | 12/1948 | Deakins . |
| 2,518,363 | 8/1950 | Orelind ........................... 172/500 X |
| 2,611,302 | 9/1952 | De Bairos ........................... 172/500 |
| 2,622,501 | 12/1952 | Bennett ............................ 172/529 |
| 2,625,092 | 1/1953 | Nikkel ............................ 172/530 X |
| 2,767,633 | 10/1956 | Franz ............................ 172/530 X |
| 3,052,306 | 9/1962 | Lynch ............................ 172/500 X |
| 3,065,802 | 11/1962 | Nikkel . |
| 3,108,642 | 10/1963 | Hunter ............................... 172/44 |
| 3,547,203 | 12/1970 | Jackoboice ......................... 172/500 |
| 3,834,466 | 9/1974 | Chandler . |

OTHER PUBLICATIONS

Minneapolis–Moline Implement Co., Catalog Model Nos. 3A & 4.
Texas Diker Advertisement.
United States Patent Office Classification Definitions, Earth Working p. 172-189, 12-1972.

Primary Examiner—Paul E. Shapiro
Attorney, Agent, or Firm—Fishburn, Gold and Litman

[57] ABSTRACT

A damming implement for depositing a series of earthen dams across a furrow to provide a line of catch or ponding basins which inhibit run-off of water includes a wheel structure having radially opposed blades oriented transversely to a line of draft for scraping a ground surface and with arcuate arms extending therefrom partly around the circumference of the wheel structure and having respective radially opposed end portions. The wheel structure is mounted in a yoke connected by a hitch to a tool bar pulled behind a tractor. A latch mounted on the yoke alternately engages a shock absorbing pad on one of the end portions of the wheel structure to prevent rotation thereof and scrape one of the blades along the ground surface for accumulating an earthen dam in front of the blade. When the latch is disengaged from the end portion, the wheel structure rotates along the ground surface and deposits the earthen dam and a succeeding arcuate arm end portion rotates into engagement with the latch to stop a succeeding blade in scraping relation. The latch is connected via a cam mechanism to a rotatable drive shaft which causes the latch to swing into and out of the path of rotation of the wheel structure to alternately permit and prevent rotation of the wheel structure.

4 Claims, 8 Drawing Figures

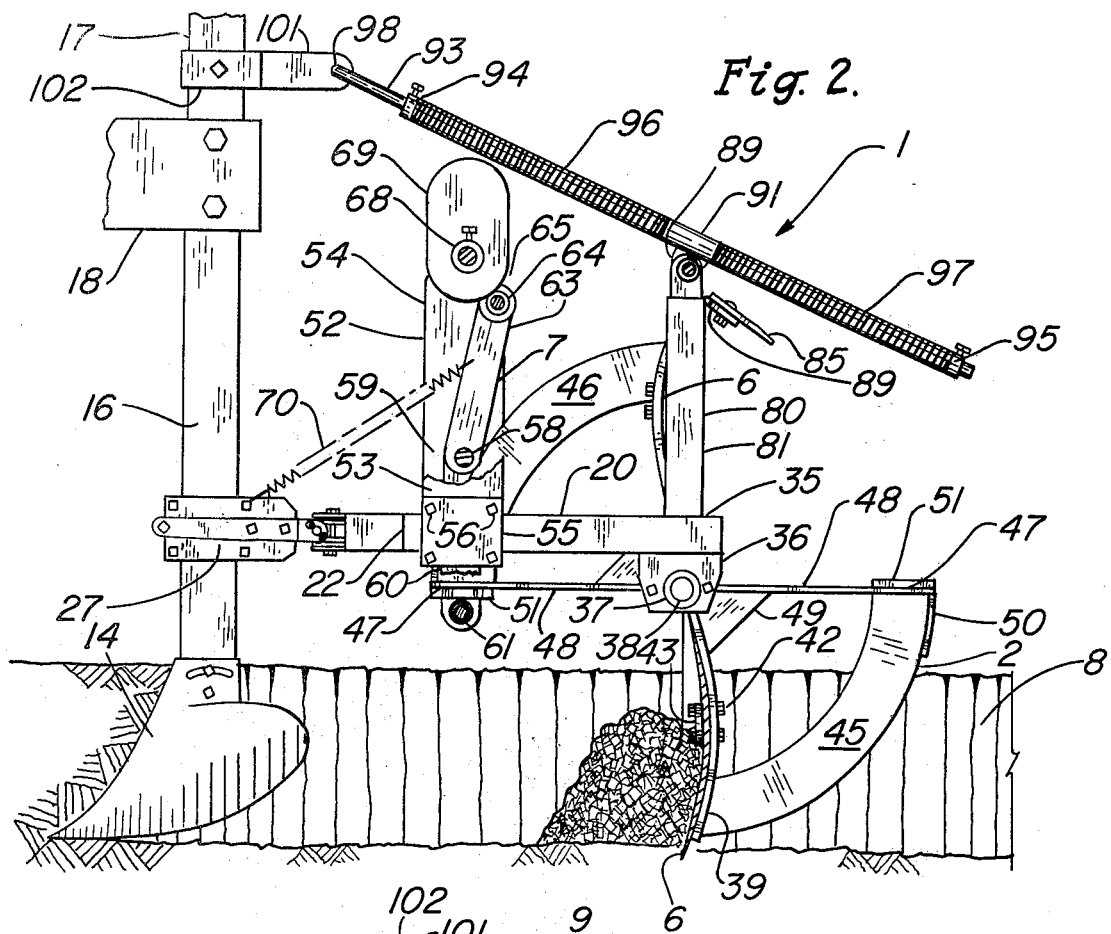
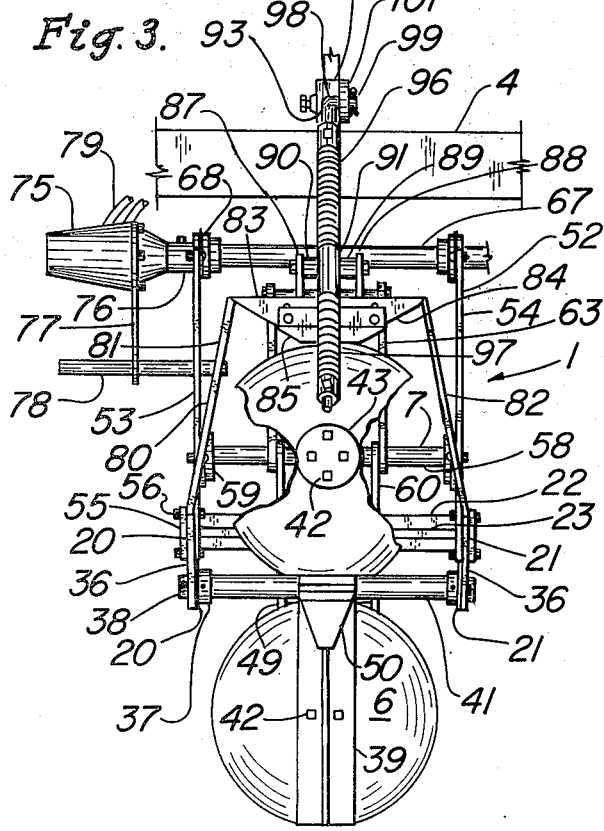
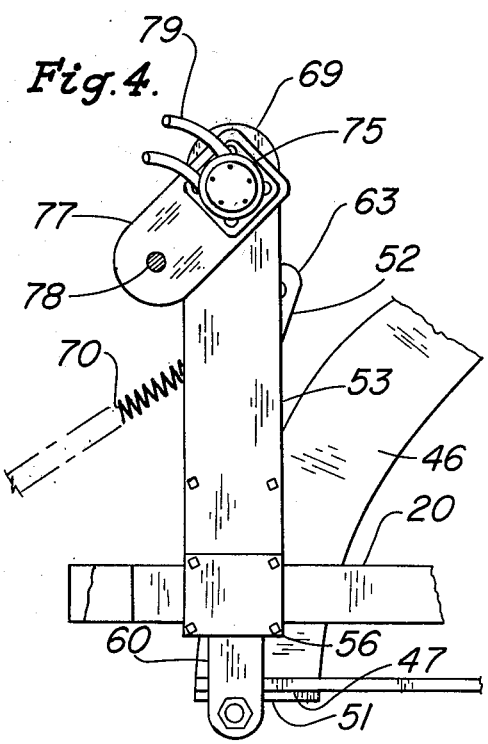

FURROW DAMMING IMPLEMENT

This invention relates to damming devices and implements and particular to such devices and implements for creating a series of earthen dams along a furrow.

Many agricultural areas, particularly in the west and southwestern areas of the United States have relatively low annual amounts of rainfall and advantage must be taken of the little rain which does fall so that the water soaks into the arable land for use by the plants growing therein and does not run off cultivated fields and into streams, drainage ditches, washes and the like. Various furrow damming implements are known in the art and are used for forming a transverse dam at intervals in a furrow to thereby define basins between the dams in which the water will be retained instead of running off along the furrow. It is important that these dams be of a well defined nature, particularly at the time of their formation, and not merely humps extending across a furrow because, as is well known, the action of wind and rainfall will tend to smooth irregularities in the field surface whereby the dams will eventually become smaller in height, less in definition and accordingly less effective. Moreover, it is also important to regulate the damming implement so that the dams can be formed at intervals of a few feet or a few yards as the nature of the land, its contour and other considerations may dictate.

In view of the above, the principal objects of the present invention are: to provide a furrow damming implement having a wheel structure with a transversely extending blade for scraping a ground surface and accumulating an earthen dam in front of the blade; to provide such an implement having a hitch means for connection to a tool bar and providing horizontal and vertical movement relative thereto as the implement is moved over a ground surface; to provide such an implement having a wheel structure with radially opposed, transversely extending blades for closely spacing a series of earthen dams across a furrow; to provide such an implement having a latch means which is swingable into and out of the path of rotation of the wheel structure to alternately prevent and permit rotation of the wheel structure for alternately scraping and depositing a series of earthen dams in the furrow; to provide such an implement having a mechanism extending between a rotatable drive shaft and the latch means for operation of the latch means; and to provide such an implement which is relatively inexpensive, highly reliable in use and well adapted for its intended purpose.

Other objects and advantages of this invention will become apparent from the following description taken in connection with the accompanying drawings wherein are set forth, by way of illustration and example, certain embodiments of this invention.

FIG. 2 is a side elevational view of the furrow damming implement.

FIG. 3 is an end elevational view of the furrow damming implement.

FIG. 4 is an enlarged fragmentary view of an end portion of the damming implement and showing a motor means for use therewith.

Figure 1:
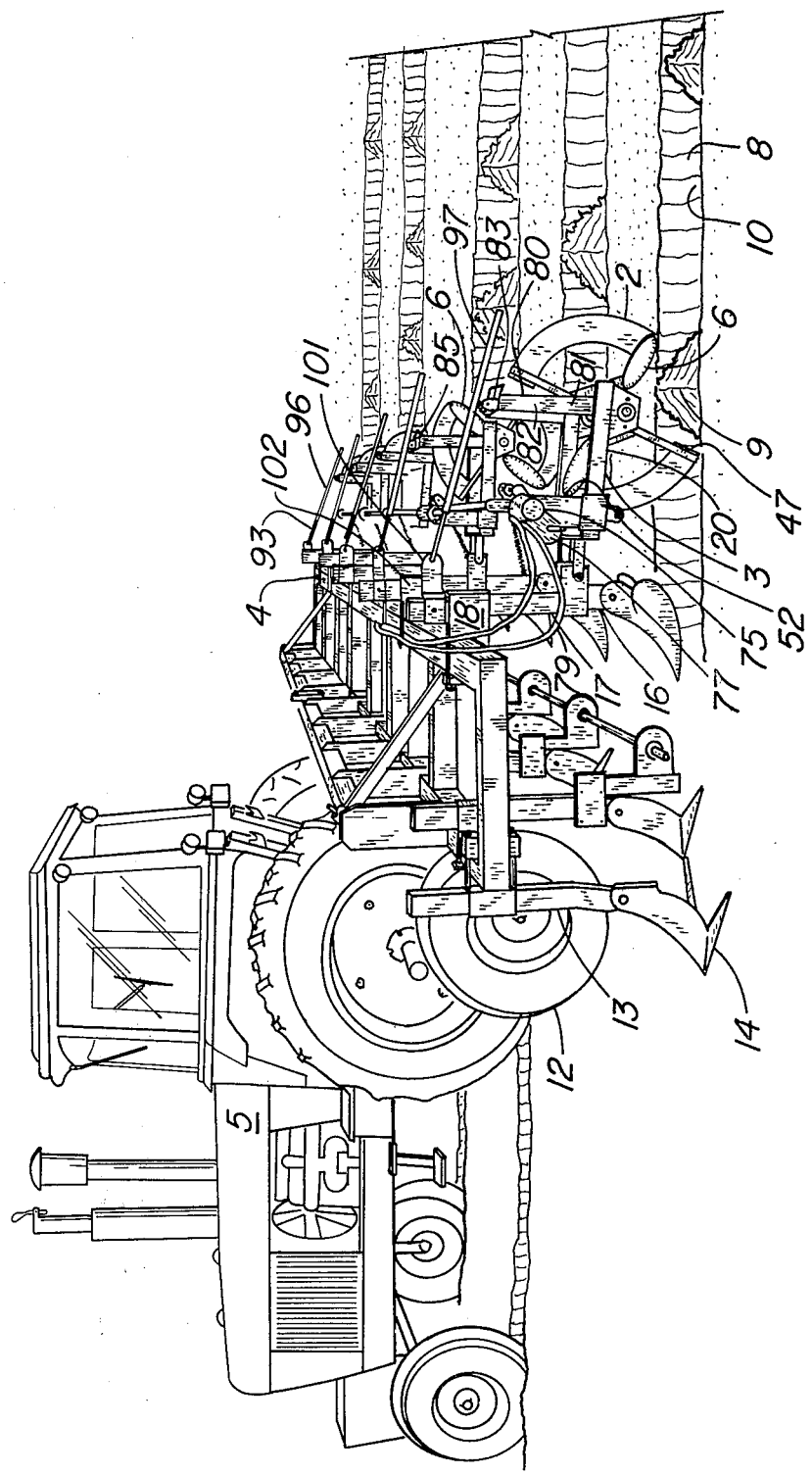
FIG. 1 is a perspective view illustrating a furrow damming implement embodying the present invention which is mounted behind a tool bar pulled by a tractor.

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as basis for the claims and as a representative basis for teaching one skilled in the art to variously employ the present invention in virtually any appropriately detailed structure.

Referring more in detail to the drawings:

The reference numeral 1 generally indicates a unit of a furrow damming implement embodying the present invention and having a wheel structure 2 rotatably mounted to a yoke 3 attached to members of a tool bar 4 and pulled by a prime mover such as a tractor 5.

The rotatable wheel structure 2 has blade members 6 mounted therein and extending generally transversely to a line of draft of the implement. The damming implement 1 includes a latch means 7 which by cooperation with stop members on the wheel structure 2, is operable to latch and unlatch the wheel structure from rotative movement whereby, when the wheel structure 2 is retained by the latch means 7 against rotative movement, the blade member 6 scrapes along a ground surface, such as of a furrow 8 and accumulates an earthen dam 9 in front of the blade. When the latch means 7 is disengaged and permits the wheel structure 2 to rotate, the blade member 6 deposits earthen dams 9 at intervals along the furrow 8 and thereby provides basins 10 within the furrow 8 between the dams 9 to catch and retain water.

In FIG. 1, a plurality of units of the damming implement 1 are shown connected in side-by-side relationship to a prime mover such as the tractor 5 and each mounted rearwardly of an exemplary implement tool bar 4 which has gauge wheels 12 and depending standards 13 with plows 14 secured thereto. Preferably, the tool bar 4 is connected to the tractor 5 via a conventional three point hitch whereby the tool bar 4 with the plows 14 and the units of the damming implement 1 trailing therebehind can be raised from ground contact.

The tool bar 4 includes a plurality of rearmost plow standards 16 which comprise elongate bars 17 positioned in depending relation from slide mounts 18.

The yoke 3 of each unit is connected to the tool bar 4 via a rearmost plow standard 16. In the illustrated example, the yoke 3 has spaced, parallel side members 20 and 21 secured to a forward cross member 22 having a web stiffener 23 therewith. Projecting forwardly and centrally located on the cross member 22 are upper and lower plate members 24 and 25 which form parallel arms of a horizontal clevis arrangement providing side to side or lateral swinging movement of the damming implement relative to the tool bar 4. Spaced arm members 27 and 28 are clamped, as by bolts 29, to a lower portion of the rearmost standard 16 and extend rearwardly therefrom and, at extreme ends thereof, accommodate a horizontally extending bushing 30 to which are secured spaced horizontally extending plates 31.

The bushing 30 is mounted between extreme ends of the arm members 27 and 28 by a horizontally extending pivot pin 32 and the yoke 3 is mounted thereto by a vertical clevis arrangement such as a pivot pin 33 extending through mutually engaged upper and lower plate members 24 and 25 and plates 31 whereby the yoke 3 moves both from side to side and up and down relative to the tool bar 4.

Depending from rearmost ends 35 of the side members 20 and 21 are shaft mounting brackets 36 having sealed bearing units 37 affixed thereto for rotatably supporting an axle 38 on which is mounted the wheel structure 2. The wheel structure is mounted in the yoke 3 for rotation generally in a vertical plane and contact with a ground surface. The wheel structure 12 includes radially opposed, earth scraping blade members 6, which, in the illustrated example, are in the form of discs. The blade members 6 are dish shaped or forwardly concave in the direction of the line of draft and are secured to curved backing members 39 secured at an inner end to an outer axle shaft 41 through which extends the axle 38. Bolts 42 secure the blade member 6 at a central portion thereof to the backing members 39 and a relatively small center disc 43 adds strength thereto. Arcuate arms 45 and 46 respectively extend from the opposed blade members 6 and extend partly around the circumference of the wheel structure in 90° arc segments thereof. The arcuate arm 45 and 46 have respective end portions 47 secured to spoke members 48 extending radially from the wheel outer axle shaft 41. Gussets 49 are affixed between the inner ends of the spoke members 48 and adjoining portions of the back member 39 for support of the spoke members 48. End gussets 50 extend between the arm end portion 47 and the spoke member 48 at the outer end thereof. In the illustrated example, the end portions 47 are relatively broad, flat faces and provide the stop members which cooperate with the latch means 7 as described above. To provide cushioning therefor to lessen noise and wear, a shock absorbent plate 51 is affixed thereto and is preferably of a suitable elastomeric material such as rubber or the like. The radially opposed blade members 6 with accompanying arms 45 and 46, in the illustrated example, form radially opposed, generally 90° arc segments circumferentially separated by respective, generally 90° open segments which permit the wheel structure 2 to pass over an earthen dam 9 accumulated forwardly of a blade member 6 in ground contact, as described below.

The yoke 3 has a forward standard 52 with spaced upstanding side members 53 and 54 secured at lower ends thereof to the respective side members 20 and 21 as by a plate member 55 with bolts 56 for sliding adjustment of the side members 53 and 54 forwardly and rearwardly on the respective yoke side members 20 and 21. In the illustrated example, the latch means 7 is positioned between the upstanding side members 53 and 54 and spaced upwardly from the yoke side members 20 and 21. The latch means 7 has an axle shaft 58 supported by spaced sealed bearing members 59 for rotation in a horizontal plane and spaced side arms 60 are secured to the axle shaft 58 in generally depending relation and support a lower catch arm 61 therebetween at respective lower ends which include a roller shaft 62. Rigidly connected to and extending upwardly from the axle shaft 58 are spaced upper side arms 63 having upper ends with an upper, transversely protruding, cam mechanism arm 64 extending therebetween. In the illustrated example, the upper cam mechanism arm 64 has a cam follower portion 65 thereon and engageable with a cam as described below. The latch means 7 is swingable between the forward standard side members 63 and 64 forwardly and rearwardly. With the lower and upper spaced side arms 60 and 63 rigidly connected together about the axle shaft 58, as the upper cam mechanism arm 64 swings rearwardly, the lower catch arm 61 swings forwardly and vice versa, FIGS. 2 and 6.

Figure 5:
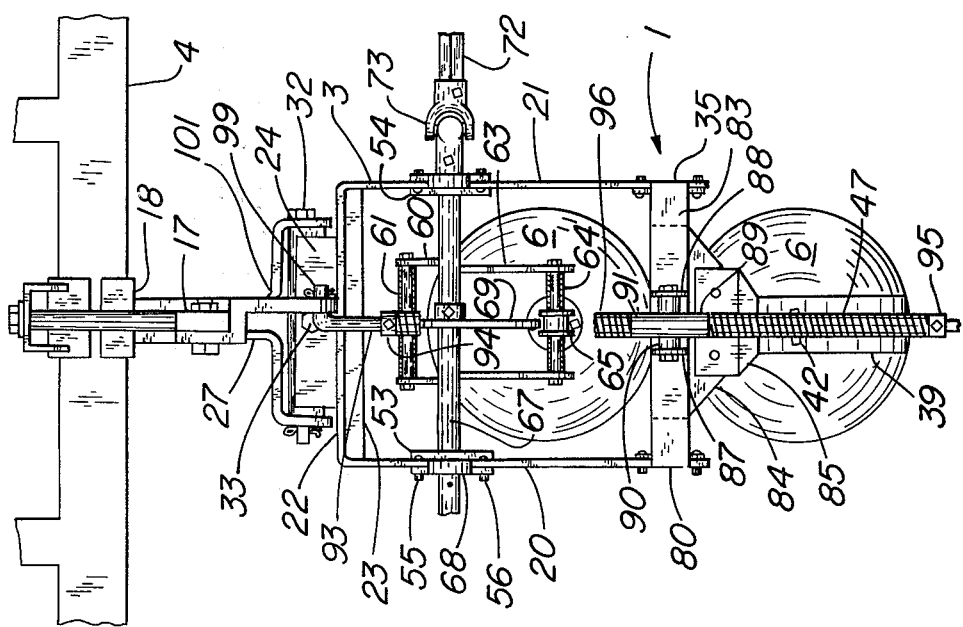
FIG. 5 is a plan view of the furrow damming implement and showing a wheel structure thereof in an unlatched relationship.

To effect swinging movement of the latch means 7, a drive means is operatively connected to the latch means and includes a rotatable drive shaft 67 supported in sealed bearing members 68 affixed atop upper ends of the forward standard side members 53 and 54. Means extend between the drive means and the latch means to cause the latch means 7 to swing in response to rotation of the drive means. In the illustrated example, sleeved on the drive shaft 67 is a cam member 69 which has a perimeter surface bearing against the cam follow portion 65 of the upper cam mechanism arm 64 and urging the upper cam mechanism arm 64 rearwardly, FIG. 6, whereby the lower catch arm 61 swings forwardly. To maintain the upper can mechanism arm 64 against the permeter surface of the cam member 69, a return spring 71 is connected between one of the spaced upper side arms 63 and the hitch arm member 27. When a plurality of side-by-side furrow damming implement 1 are employed, FIG. 1, the individual drive shafts 67 are connected together for rotation as by coupling shafts 72, FIGS. 1 and 5, which preferably employ universal joints 73 to permit flexure between the shaft and movement between adjoining units.

Means are provided to cause rotation of the drive shaft 67 and in the example shown in FIGS. 1, 3 and 4, a pressurized hydraulic oil powered motor 75 with connection lines or hoses 79 to the tractor 5 has an output end 76 receiving an end of the drive shaft 67. An arm 77 is secured to the motor 75 and extends laterally therefrom and a shaft 78 protrudes from the extreme end of the arm 77 and in line with the coupling shafts 72 and drive shafts 67. The length of the shaft 78 is such that an end thereof contacts a side edge of the front standard side member 53 and bears thereagainst to stop rotation of the motor 75 and cause the rotary drive of the motor 75 to rotate the drive shafts 67 and couplings shafts 72. In the illustrated example, the shafts 67 and 72 rotate counterclockwise as viewed from the left, FIG. 3, and the arm arrangement of the motor 75 provides protection against reversing strain on the motor in case of binding or the like.

A biasing means extends from the yoke 3 to the tool bar 4 for urging the wheel structure 2 downwardly into earth scraping contact with the ground surface and in the illustrated example, includes a rear standard 80 having spaced, upstanding side members 81 and 82 and an upper cross arm 83. The rear standard 80 straddles the wheel structure 2 whereby the cross arm 83 is positioned above the wheel structure 2 and has a downwardly angled flange 84 thereon to which is secured a mud scraper 85 for cleaning the wheel structure 2 as it rotates thereunder and prevents excessive accumulation of wet, sticky soil.

Spaced ears 87 and 88 are secured to the cross arm 83 and extend upwardly thereof for connection of a sleeve member 89 therebetween having a horizontal sleeve portion 90 and an upwardly angled sleeve portion 91 secured thereto. An elongate rod 93 extends through the upwardly angled sleeve portion 91 and has forward and rearward collars 94 and 95 adjustably affixed thereto and with front and rear coil springs 96 and 97 sleeved thereon whereby the sleeve member 89 is positioned intermediately on the rod 93. A front end 98 of the rod 93 has an angled arm 99 extending therefrom and received by a rearwardly extending ear portion 101 projecting from a slide mount 102 affixed to an upper end of the bar 17 of the standard 16 above the connection thereof with the tool bar 4.

In the construction of the exemplary damming implement 1, many of the components thereof are adjustable so as to maintain correct relationships for proper functioning. The forward standard 52 is adjustable forwardly and rearwardly on the yoke 3 by loosening the bolts 56 on the plate members 55 and sliding the side members 53 and 54 forwardly and rearwardly to make the proper alignment between the lower catch arm 61 of the latch means 7 and the arcuate arm end portions 47. To adjust for proper depth of the scraping blade members 6, the slide mount bolts 29 are loosened and the arm members 27 and 28 moved upwardly or downwardly as desired on the rearmost plow standard 16. To adjust the biasing pressure on the wheel structure 2 and yoke 3, the collars 94 and 95 are to be repositioned as desired to urge the sleeve member 89 into a desired intermediate position on the rod 93 and thereby tend to move the yoke 3 and wheel structure 2 upwardly and downwardly as the sleeve member 89 is respectively positioned forwardly and rearwardly.

In the operation of the furrow damming implement 1, the operator of the tractor 5 lowers the tool bar 4 so that the plows 14 thereof run at the desired depth and plow furrows 8. The furrow damming implements 1 are positioned so that the blade members 6 thereof run in the furrows 8 and scrape the bottom and sides of the furrows 8 to accumulate an earthen dam in front of the blade. Pressurized hydraulic fluid is routed from the tractor 5 to the motor 75 via the hoses 79 and causes the drive shafts 67 and coupling shafts 72 to rotate, thereby causing rotation of the cam member 69 and swinging movement of the latch means 7 by contact of the cam follower portion 65 with the cam member 69. When the upper cam mechanism arm 64 is swung forwardly, FIG. 2, the lower catch arm 61 swings rearwardly and the end portion 47 of the arcuate arm is engaged therewith to prevent rotation of the wheel structure 2 and cause the blade member 6 to scrape along the furrow. When the cam member 69 reaches the extreme movement position thereof shown in FIG. 6, the upper cam mechanism arm 64 is urged rearwardly with accompanying forward movement of the lower catch arm 61 which then disengages from the end portion 47 and permits the wheel structure 2 to rotate the roll on the edge of the respective arm 45 or 46, thereby depositing the earthen dam 9, FIG. 6, transversely to the line of draft and across the the furrow 8.

Figure 6:
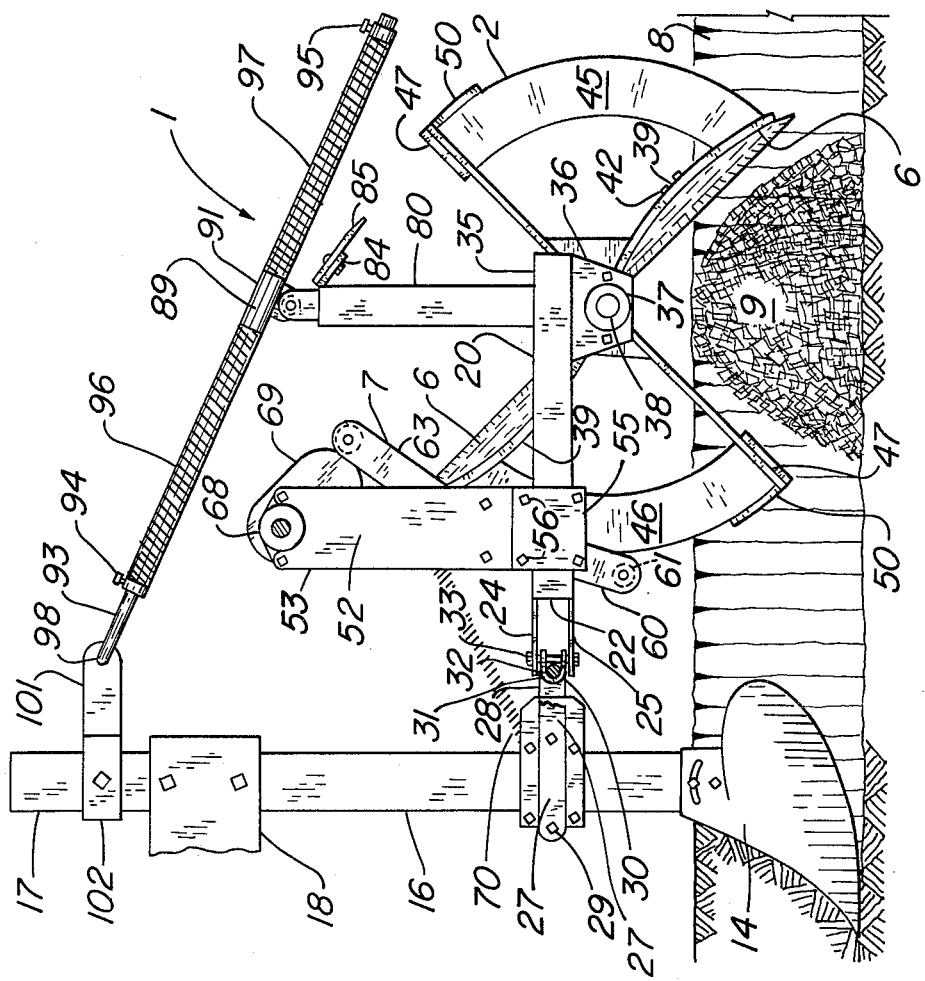
FIG. 6 is a side elevational view of the furrow damming implement and showing same in an unlatched relationship depositing an earthen dam thereunder.

As the cam member 69 rotates beyond the extreme position thereof shown in FIG. 6, the upper cam mechanism arm 64 is pulled rearwardly by the return spring 70 and the lower catch arm 61 swung into the rotative path of the wheel structure 2 in one of the opposed 90° portions thereof not filled by the arcuate arms 45 and 46. As the wheel structure 2 rotates, the end portion 47 of the opposite arcuate arm 46 swings downwardly, and engages the lower catch arm 61 in order to lock the succeeding, or next following, blade member 6 into earth engaging and scraping relationship whereby a succeeding dam 9 is formed in the furrow and the series of earthen dams 9 create succeeding basins 10 therebetween to pond water run-off.

The drive means described above utilizing pressurized hydraulic fluid to cause rotation of the drive shaft 67 and coupling shafts 72 enables the dams 9 to be formed across the furrows 8 at even intervals thereof, assuming a constant rate of forward travel of the tractors, whereby the basins 10 are of the same length. If a different basin length is desired, the speed of aoperation of the damming implement can be varied by increasing or decreasing the flow of hydraulic oil from the pumps thereof within the tractor 5 through the hydraulic hoses 9 to the motor 75. When the end of a tilling row is reached and it is needed to reverse the direction of movement of the tractor 5 and make another pass at the field, the tool bar 4 and damming implements 1 are raised from ground contact by the three point hitch arrangement of the tractor 5 and, during the time when the damming implements 1 are raised from ground contact, the flow of hydraulic oil to the motor 75 may be closed to prevent rotation of the shafts 67 and 72 and operation of the latch means 7.

Figure 8:
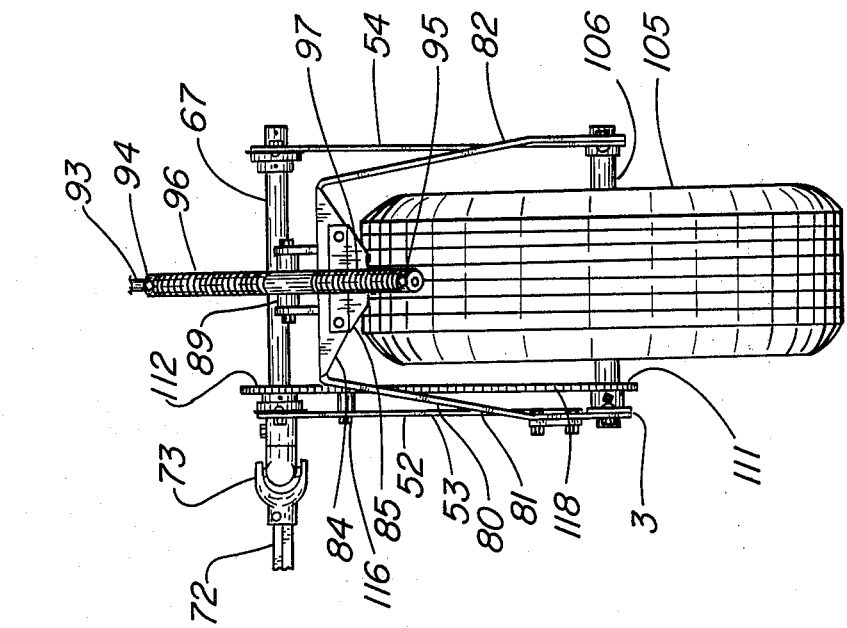
FIG. 8 is an end elevational view of the alternative form of drive means.
Figure 7:
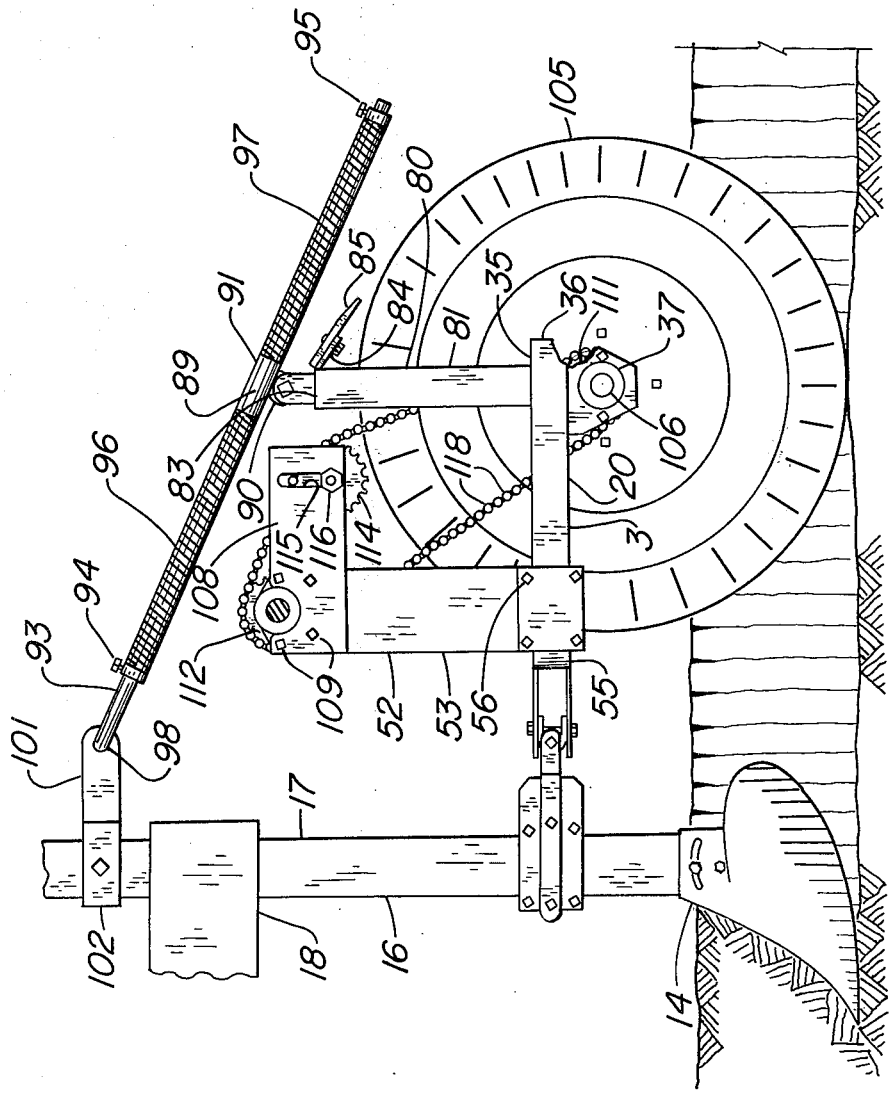
FIG. 7 is a side elevational view of an alternate embodiment of drive means for the furrow damming implement.

An alternative form of drive means is shown in connection with FIGS. 7 and 8 whereby a hydraulic motor 75, as shown in connection with FIGS. 1 through 6 is not employed to cause rotation of the shafts 67 and 72 and instead, rotation thereof is caused by a ground engaging drive wheel 105 used in conjunction with one or more wheel structures 2. The drive wheel 105 is rotatably mounted on an axle 106 between the side members 20 and 21 of the yoke 3 instead of a wheel structure 2.

The forward standard 52 is mounted on a front portion of the yoke 3 and does not support a latch means 7 as shown in connection with FIGS. 1 through 6 and instead supports power transfer means connecting the drive wheel 105 with the shafts 67 and 72. An arm 108 extends rearwardly from a top portion of the side member 53 and is affixed thereto as by bolts 109. A lower sprocket 111 is affixed to the axle 106 and an upper sprocket 112 axially secured to the drive shaft 67. The arm 108 supports a tensioning sprocket 114 which is vertically adjustable by means of an elongate channel 115 and a fastener such as a bolt 116. A drive chain 118 extends around the sprockets 111 and 112 and 114 and transmits rotational power of the drive wheel 105 to the shafts 67 and 72 for causing powered rotation thereof and operation of the latch means 7 as described above. The spacing or interval between the dams may be selected by changing the size of the lower and upper sprockets 111 and 112.

It is to be understood that while certain forms of this invention have been illustrated and described, the invention is not to be limited to the specific forms or arrangement of parts herein described and shown, except insofar so such limitations are included in the following claims.

What is claimed and desired to secure by Letters Patent is:

1. An agricultural furrow damming implement comprising:
 (a) a yoke having a hitch means at a front end thereof for attachment to a tool bar;
 (b) a wheel structure mounted in said yoke for rotation generally in a vertical plane and contact with a ground surface; said wheel structure having spaced, oppositely positioned earth scraping discs of dish shape extending radially from a center axis and having respective outer edges substantially at a circumference of said wheel structure; said wheel structure having spaced, opposite arms respectively extending arcuately in trailing relation to each of said discs and extending entirely along the circumference of said wheel structure for approximately 90° arc segments thereof; said arms terminating in respective end portions; spaced, opposite spoke members extending radially from said center axis and respectively terminating in juncture with said arms at said end portions;

(c) a stop portion at the juncture of each of said arm end portions and said spoke members;

(d) a shock absorbant pad mounted on each said stop portion;

(e) a latch means mounted on said yoke including a catch portion swingable into the rotational path of said stop portion for engagement therewith to stop rotation of said wheel structure and scrape said discs along the ground surface to accumulate an earthen dam thereby and swingable from the rotational path of said stop portion for disengagement therefrom to permit said wheel structure to rotate and deposit said earthen dam; said catch portion engaging said pad with said pad cushioning the force of engagement for relatively low noise and wear;

(f) a drive means connected to said latch means; and (g) a means operably connected between said drive means and said latch means and operable to cause said latch means to swing out of engagement with said stop portion in response to operation of said drive means.

2. The damming implement set forth in claim 1 wherein:

(a) said drive means includes a drive shaft; and (b) a motor utilizing pressurized hydraulic fluid connected to said drive shaft and having hoses for connection to a source of pressurized hydraulic fluid on a tractor unit pulling said damming implement whereby said motor causes rotary movement of said drive shaft.

3. The damming implement set forth in claim 1 wherein:

(a) said drive means includes a drive shaft; and (b) a ground engaging drive wheel associated with said wheel structure and said latch means and mounted within a yoke structure pulled behind said tool bar;

(c) said drive wheel and said drive shaft having sprockets mounted therein and with a drive chain extending between and connected to said sprockets for causing rotation of said drive shaft.

4. An agricultural furrow damming implement for attachment to a tool bar and comprising:

(a) a circular wheel structure having a center axis and aligned for rolling over a ground surface in a line of draft, said wheel structure having spaced, oppositely positioned, earth scraping discs of dish shape extending radially from said center axis and having respective outer edges substantially at a circumference of said wheel structure;

(b) spaced, opposite arms respectively extending arcuately in trailing relation to each of said discs and extending entirely from respective said outer edges along the circumference of said wheel structure for approximately 90° arc segments thereof; said arms terminating in respective end portions;

(c) spaced, opposite spoke members extending radially from said center axis and respectively terminating in juncture with said arms at said end portions;

(d) a shock absorbant pad mounted on each of said end portions;

(e) a yoke having a front portion with spaced side members and a forwardly extending hitch means for connection to a tool bar and including means providing upward and downward movement for travel over a ground surface; said wheel structure being rotatably mounted between said side members for rotation in a vertical plane;

(e) a latch means secured to the front portion of said yoke and extending generally between said side members forwardly of said wheel structure for forward and rearward swinging movement, said latch means including spaced standards upstanding from said side members with an axle member extending therebetween, a lower, transversely extending catch arm rigidly connected to said axle member and generally located in horizontal alignment with said center axis and an upper, transversely extending cam follower arm and a return spring connected to said latch means; said latch means being swingable on said axle member to move said catch arm into and out of a path of rotation of said wheel structure and provide engagement and disengagement of said catch arm with one of said arm end portions; said catch arm engaging said pad with said pad cushioning the force of engagement for relatively low noise and wear;

(f) a biasing means extending forwardly from said yoke and having a forward end for attachment to a tool bar; said yoke having spaced rear standards upstanding therefrom and adjacent said wheel structure and having an upper cross arm positioned above said wheel structure and with a sleeve member pivotally mounted thereon; said biasing means including an elongate rod with front and rear ends extending through said sleeve member and with front and rear coil springs sleeved on said rod respectively between said sleeve member and said front and rear ends with said coil springs urging said sleeve member toward an intermediate position on said rod and biasing said wheel structure into earth engaging relation; and (g) drive means operatively connected to said latch means and including a drive shaft rotatably mounted to said front standards for up and down movement therewith and a cam secured to said drive shaft and engaging said cam follower arm to urge said catch arm rearwardly into the path of rotation of said wheel structure to engage with said one of said arm end portions and cause a preceding one of said discs to scrape and accumulate a mound of earth and then to swing forwardly from the path of rotation and disengage from said one of said arm end portions and permit said wheel structure to rotate smoothly on one of said arms on the ground surface and pass over said mound of earth.

* * * * *